(12) United States Patent
Large et al.

(10) Patent No.: US 8,267,472 B2
(45) Date of Patent: Sep. 18, 2012

(54) SEAT PROVIDED WITH A PIVOTING DISPLAY SCREEN

(75) Inventors: Serge Large, Cenac (FR); Stéphane Poveda, Merignac (FR); Patrick Vouillon, Martignas/Jalle (FR)

(73) Assignee: Thales, Neuilly sur Seine (FR)

( * ) Notice: Subject to any disclaimer, the term of this patent is extended or adjusted under 35 U.S.C. 154(b) by 291 days.

(21) Appl. No.: 12/595,880

(22) PCT Filed: May 7, 2008

(86) PCT No.: PCT/EP2008/055611
§ 371 (c)(1),
(2), (4) Date: Mar. 26, 2010

(87) PCT Pub. No.: WO2008/141938
PCT Pub. Date: Nov. 27, 2008

(65) Prior Publication Data
US 2010/0171350 A1    Jul. 8, 2010

(30) Foreign Application Priority Data

May 11, 2007  (FR) .................................... 07 03385

(51) Int. Cl.
*A47C 7/72*  (2006.01)
(52) U.S. Cl. ..................... 297/217.3; 297/145; 297/155; 297/188.15
(58) Field of Classification Search .................. 297/145, 297/155, 162, 188.15, 188.16, 188.17, 217.3
See application file for complete search history.

(56) References Cited

U.S. PATENT DOCUMENTS

| 258,354 | A | * | 5/1882 | Bell .............................. 248/456 |
| 1,196,050 | A | * | 8/1916 | Watkins ........................ 297/162 |
| 2,330,627 | A | * | 9/1943 | Reynolds ...................... 297/145 |
| 5,337,676 | A | * | 8/1994 | Ahad ............................ 104/139 |
| 5,452,950 | A | * | 9/1995 | Crenshaw et al. ......... 312/223.3 |
| 5,547,247 | A | * | 8/1996 | Dixon ........................... 297/145 |
| 5,547,248 | A | * | 8/1996 | Marechal ................. 297/188.17 |
| 5,765,911 | A | * | 6/1998 | Sorenson ..................... 297/173 |
| 5,927,799 | A | * | 7/1999 | Tornero ........................ 297/145 |
| 6,375,257 | B1 | * | 4/2002 | Wooding et al. ............. 297/162 |
| 6,719,343 | B2 | * | 4/2004 | Emerling et al. .......... 296/24.34 |
| 7,311,354 | B2 | * | 12/2007 | Giasson ........................ 297/161 |
| 2003/0233659 | A1 | | 12/2003 | Guerin |
| 2005/0012375 | A1 | | 1/2005 | Giasson |

FOREIGN PATENT DOCUMENTS

DE    197 05 754 A1    8/1998
DE    200 16 393 U1    2/2002

* cited by examiner

*Primary Examiner* — Peter R. Brown
(74) *Attorney, Agent, or Firm* — LaRiviere, Grubman & Payne, LLP

(57) ABSTRACT

The general field of the invention is that of seats comprising foldaway trays. More precisely, the seat according to the invention is specifically adapted in order to fold away large-dimension screens. It comprises at least one armrest and a foldaway display screen. The screen comprises an articulated supporting arm mounted on a movable carriage and the armrest comprises a circularly arcuate rail, the top end of the rail being substantially vertical and the bottom portion substantially horizontal, the carriage being secured to said rail and being able to move in translation between a first bottom position for stowage of the screen and a second top position of the screen. The screen may also comprise a cover so that it can be used as a tray.

6 Claims, 4 Drawing Sheets

SEAT PROVIDED WITH A PIVOTING DISPLAY SCREEN

PRIORITY CLAIM

This application claims priority to PCT Patent Application Number PCT/EP2008/055611, entitled A Seat Provided With a Pivoting Display Screen, filed on May 7, 2008, also claiming priority to FR 0703385, filed May 11, 2007.

TECHNICAL FIELD

The field of the invention is that of seats comprising foldaway trays. The invention is particularly suitable for use in air transportation.

DESCRIPTION OF THE PRIOR ART

For a certain number of uses, a seat may be fitted with a foldaway tray. Mention will be made, for example, of the seats for conference halls or for transportation means such as trains or aircraft. These trays are used essentially as a support for reading, writing or placing meal trays. They are usually light and of small dimensions in order to be easily handled by the user.

BACKGROUND ART

Currently there are flat display screens that may comprise one or more interfaces making it possible to interact with the information presented. These screens are usually liquid crystal displays. The interface may conventionally consist of control buttons, a touch-sensitive surface or a transparent touch-sensitive screen placed on the screen. The touch-sensitive screens operate either by detecting contact, these screens being known as "touch-screens", or by force feedback. These flat screens can be used as a tray.

A flat screen comprises three major differences compared with a simple tray. It is heavier and more bulky. Its size and its weight are equivalent to those of a laptop computer. Typically, the screen format is rectangular, of the "A4" sheet type. Furthermore, the screen usually comprises supply and communication cables which do not make handling easy. Finally, it is more fragile and markedly more costly. It is therefore essential that, when the user handles this screen in order to use it or to stow it away, these operations are simple, requiring no particular effort for the user and can be carried out in total security for the screen.

In air transportation, it is possible to use this type of tray either in the cockpit or in the passenger cabin.

In the cockpit, the screen provides information that is additional to the display screens placed fixedly on the instrument panel. It can be used notably in certain flight phases and on the ground. Specifically, certain information needs to be displayed only temporarily and can be displayed on foldaway screens. Usually, these foldaway screens are stowed beneath the instrument panel, which necessarily limits their size and their weight.

In the passenger cabin, the screen may allow the passenger to obtain information, to communicate or to amuse himself. In this case, the screen is conventionally stowed either in the back of the seat in front, or in the armrest. In both cases, in order to be folded away, the current systems have simple vertical movements which do not allow the use or the stowage of large-dimension screens, so they cannot be completely folded away.

SUMMARY OF THE INVENTION

Thus, the seat according to the invention comprises a foldaway display screen comprising particular mechanical arrangements making it possible to significantly ease the handling and stowage of this screen.

More precisely, the subject of the invention is a seat, notably for aircraft, comprising at least one armrest and a foldaway display screen, characterized in that the screen comprises an articulated supporting arm mounted on a movable carriage and in that the armrest comprises a circularly arcuate rail, the top end of the rail being substantially vertical and the bottom portion substantially horizontal, the carriage being secured to said rail and able to move in translation between a first bottom position for stowage of the screen and a second top position of use of the screen.

Advantageously, the armrest comprises a damping system secured to the armrest and to the carriage, the damping system being able to comprise a cable running in at least one movable pulley secured to a return spring.

Advantageously, the articulated supporting arm comprises a hinge secured to the arm and to the movable carriage arranged so that the screen can tilt from the second top position in which the screen is in a substantially vertical position to a third top position in which the screen is in a substantially horizontal position. It may also comprise a swivel joint making it possible to rotate the screen through 90 degrees in a horizontal plane from the third position to a fourth position.

Advantageously, the screen comprises a movable protective cover making it possible to use the screen as a tray, the screen may also comprise at least one handle.

Finally, the seat may comprise motorization means ensuring at least the movement of the carriage, said means being controlled by a user seated on the seat.

BRIEF DESCRIPTION OF THE DRAWINGS

The invention will be better understood and other advantages will appear on reading the following description given in a nonlimiting manner and thanks to the appended figures, amongst which.

MORE DETAILED DESCRIPTION

Figure 1:
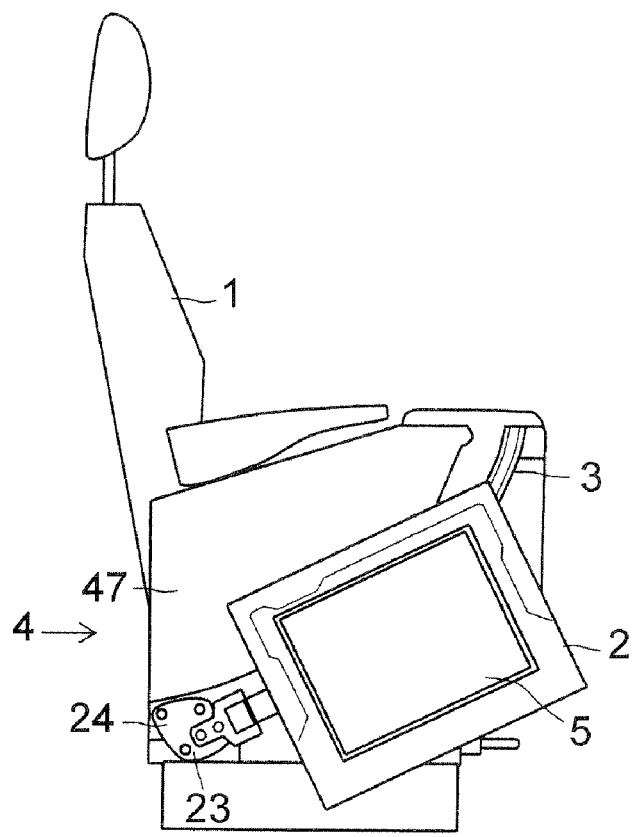
FIG. 1 represents a side view of a seat according to the invention, the screen being folded away.

The essence of the invention consists in making the screen move on a circularly arcuate rail. This particular shape of rail makes it possible, unlike the systems that allow only a purely vertical movement, to limit the effort by increasing the path followed and by beginning it on a horizontal portion. As will be seen, this system may be either manual or motorized. In its manual version, a damping system may be coupled to the translation system in order to further minimize the effort of taking out the screen and in order to lessen the weight during the foldaway maneuver.

As a nonlimiting example, FIGS. 1 to 8 represent various views of a system according to the invention, the screen being represented in various positions in these views. It is of course possible to construct many simple mechanical variants from this first exemplary embodiment.

In these figures, the seat 1 is essentially represented in a side view. The portions of the seat that are not associated with the device according to the invention are not described. For purposes of clarity, the electric cables providing the power supply of the screen and the conveyance of the digital data are not represented in these various figures. They are installed inside the armrest so as to be accessible as little as possible to the user.

The seat essentially comprises:
  an armrest 4, the whole of the foldaway device being masked by an armrest cover 47. In FIGS. 4 to 7, the armrest cover 47 is not shown so as to reveal the mechanism situated beneath. The armrest 4 comprises a circularly arcuate rail 3, the top end of the rail being substantially vertical and the bottom end substantially horizontal;
  a foldaway display screen 2 comprising a display zone 5. Usually, this screen is a liquid crystal color display. As has been said, the screen comprises either control buttons or a touch-sensitive surface or a transparent touchscreen placed on the display surface. It is preferable, to the extent that the screen may be used as a tray, that the screen has a certain seal against dust and liquids. The screen comprises a supporting arm 22. One of the ends of the arm is articulated by means of a hinge 23, itself mounted on a movable carriage 24. The carriage is secured to said rail and is movable in translation, carrying the screen between a first bottom position for stowage and a second top position of the screen. In the exemplary embodiment, the carriage comprises three drive rollers situated on either side of the rail. The other end of the arm is connected to the screen 2 by means of a mechanical swivel joint 25. The screen may comprise a movable cover 21 as shown in FIGS. 2 and 4 to 8. It may also comprise handles 27 making it easier to handle the screen. The mechanical parts are made of light materials and the articulated arm may comprise grooves or slots so as to lighten the mechanical assembly in the best possible way;
  a damping system 41 secured to the armrest and to the movable carriage. In the exemplary embodiment, the damping system is produced by means of a cable 42 travelling across seven pulleys 45. Four of these pulleys are fixed and secured to the armrest 4. The other three pulleys are secured to movable rods 44 connected to return springs 43 so that, when the carriage slides along the rail, the cable pulls on the movable pulleys causing the return springs to extend. This damps the weight of the screen. A stop 46 situated on the armrest makes it possible to limit the travel of the screen. Naturally, other damping systems can be envisaged.

Thanks to these various mechanical means, the display screen may adopt four different positions shown in FIGS. 1 to 8.

Figure 2:
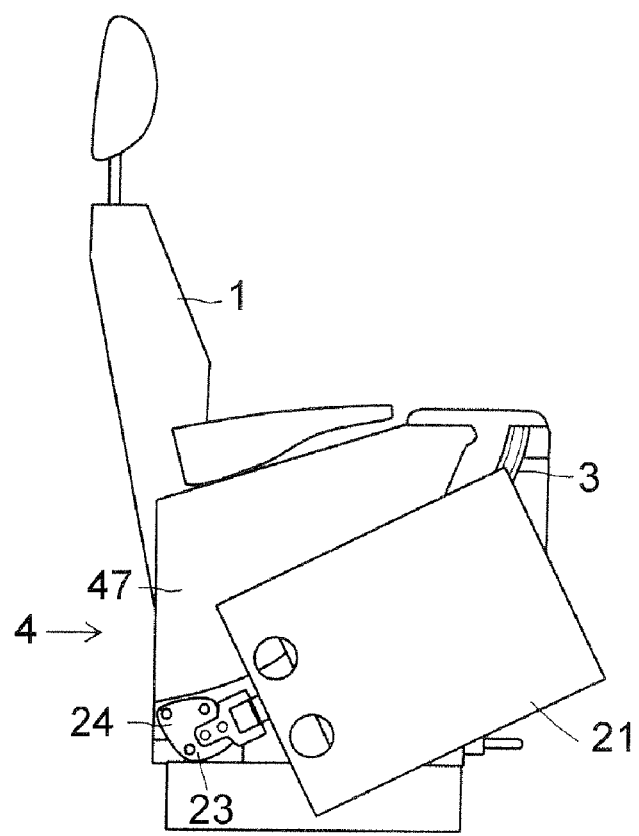
FIG. 2 represents a side view of a seat according to the invention, the screen being folded away and comprising a protective cover.

In FIGS. 1 and 2, the screen is in the bottom stowage position or foldaway position; it is flattened vertically against the armrest and completely releases the space situated in front of the seated person. The security stop makes it possible to limit the travel of the screen. In FIG. 1, the screen is shown without its protective cover 21 and, in FIG. 2, the cover is shown.

Figure 3:
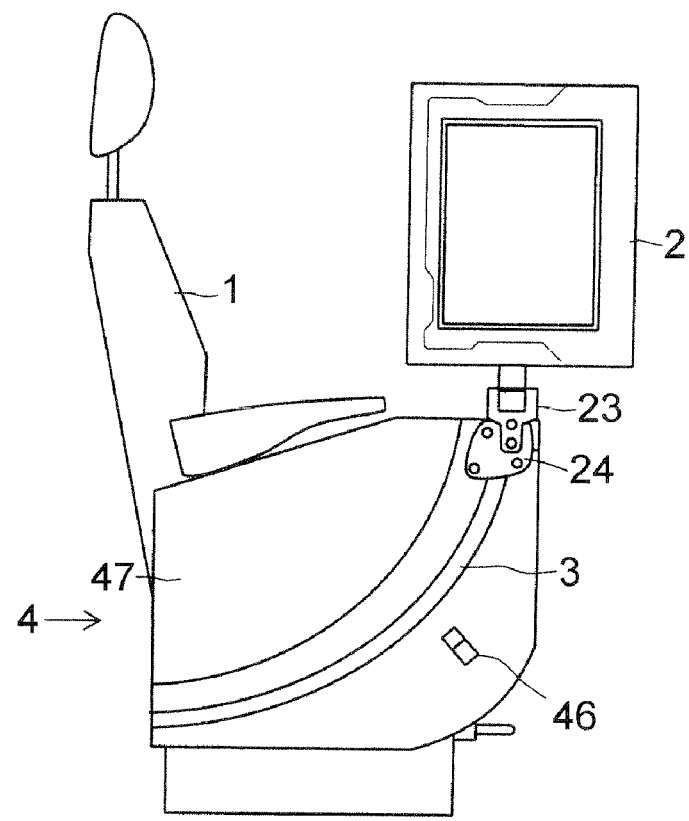
FIG. 3 represents a side view of a seat according to the invention, the screen being in the top vertical position.
Figure 4:
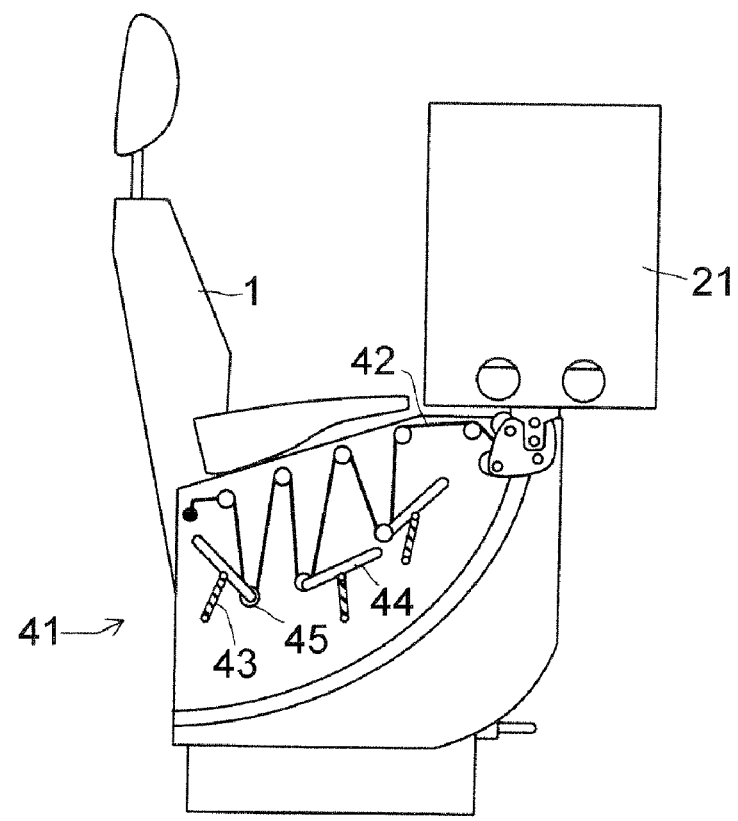
FIG. 4 represents a side view of a seat according to the invention, the screen being in the top vertical position, comprising a protective cover, the armrest cover being removed.

If the seated person wishes to use the screen, he grasps the handle 27 which is close to the top edge of the armrest and pulls it. The carriage is pulled along the rail 3 and follows a circularly arcuate trajectory. This movement makes it possible to limit the effort of the user, all the more so because the movement is made easier by the damping system 41 which partly compensates for the weight of the screen. Finally, as shown in FIGS. 3 and 4, the screen is vertical in a second position called the top vertical position. In FIG. 3, the cover is not shown. In FIG. 4, the cover 21 is shown and the armrest cover is removed, showing the mechanism of the damping system.

Figure 5:
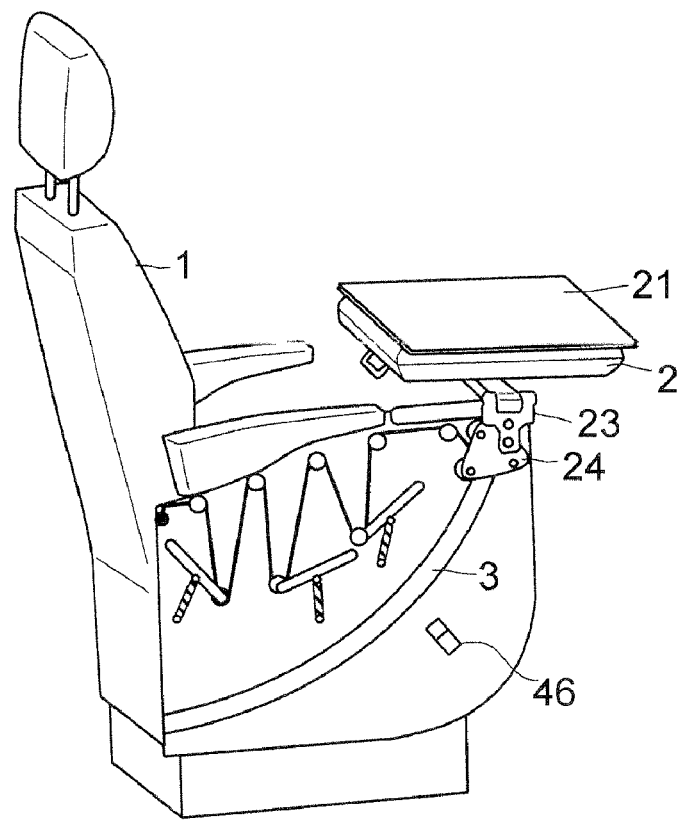
FIG. 5 represents a side view of a seat according to the invention, the screen being in the top horizontal position, comprising a protective cover, the armrest cover being removed.
Figure 6:
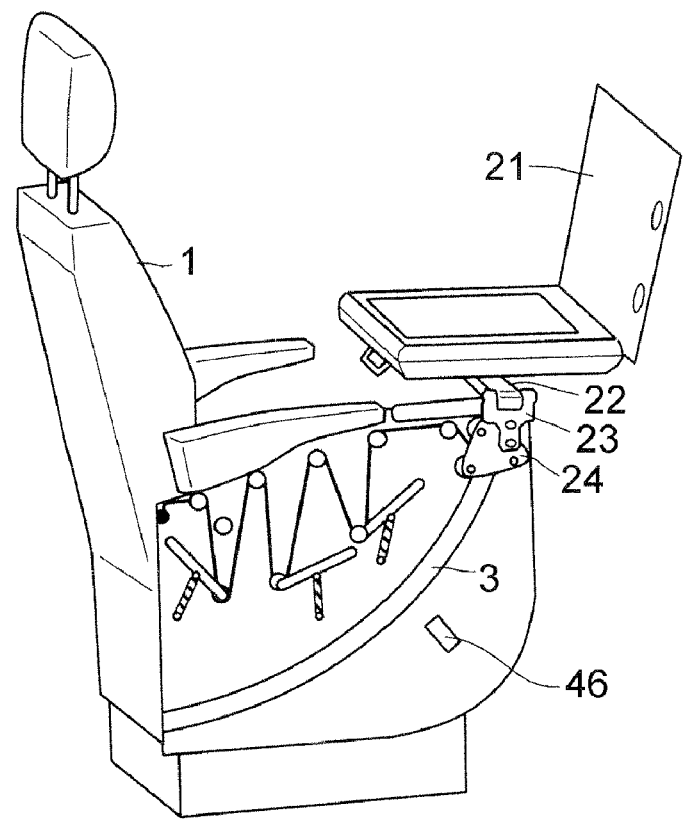
FIG. 6 represents a side view of a seat according to the invention, the screen being in the top horizontal position, comprising a raised protective cover, the armrest cover being removed.

Once the screen is in the top position, the user tilts it to the horizontal in order to place it in front of him, the supporting arm being articulated by means of a hinge 23. This hinge comprises stops so as to hold the screen in a substantially horizontal position as shown in FIGS. 5 and 6. In FIG. 5, the cover 21 is pressed against the screen. It is then possible to use the screen as a tray. In FIG. 6, the cover is in the open position. It is then possible to use the screen as such. The geometric configuration in the open position of the cover depends essentially on the location of the seat. In the passenger cabin, the travel of the cover is limited by the seat in front. Installed in a cockpit, it is very important that, in the open position, the cover does not hamper the view of the instrument panel. There are two situations. Either the user folds the cover away completely without knocking into the instrument panel by turning it through at least 180 degrees. Or, if the above maneuver is not possible, because of the closeness of the instrument panel, it is then preferable to take off the cover.

Figure 7:
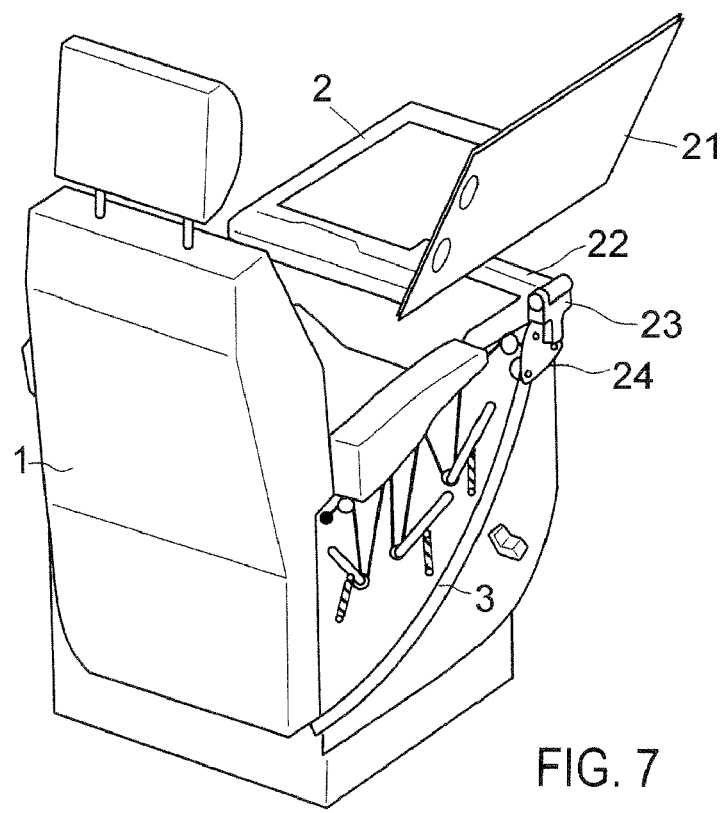
FIG. 7 represents a three-quarter view of a seat according to the invention, the screen being in the top horizontal position rotated through 90 degrees, comprising a raised protective cover, the armrest cover being removed.

Usually, display screens are rectangular. It is valuable to be able to use the screen either in "portrait" or "text" mode, or in "landscape" mode. Thus, the supporting arm comprises a swivel joint 25 making it possible to rotate the screen and the cover through 90 degrees in a substantially horizontal plane from the third position of use, called "landscape", to a fourth position of use, called "portrait" or "text" as illustrated in FIG. 7.

Figure 8:
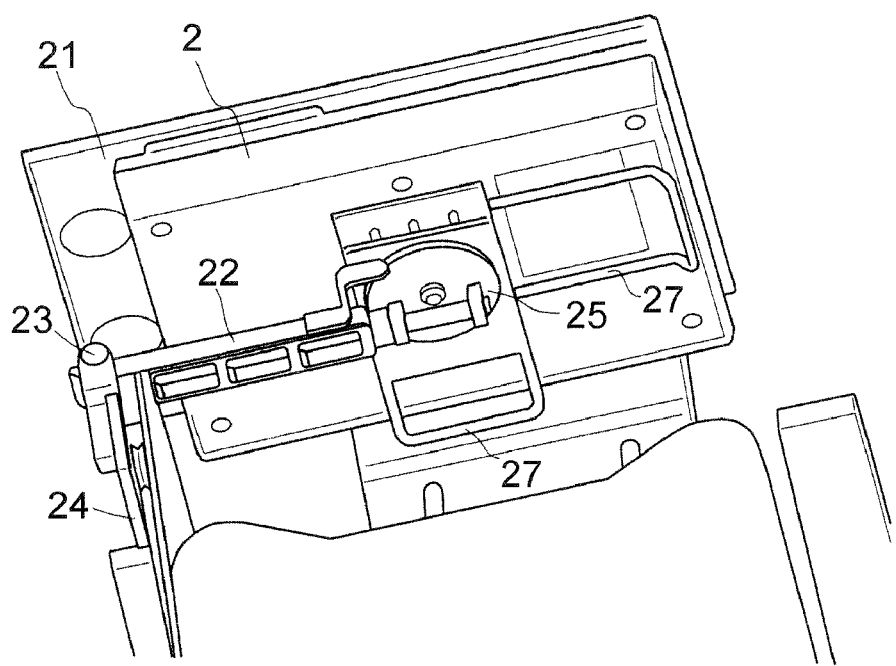
FIG. 8 represents a view from below of the screen in the top horizontal position.

FIG. 8 represents a view from below of the screen in the top horizontal position. This view shows the details of arrangement of the swivel joint 25 and of the two handles 27 made up of bent cylindrical rods. As can be seen in this view, the cover 21 may comprise holes 26 in which it is possible to place cups when the cover is used as a meal tray carrier.

To make handling easier, it is possible to motorize at least the movement of the carriage along the rail. In this case, it is no longer necessary to install a damping system inside the armrest. The rail then comprises a rack and the carriage a wheel or a gear pinion secured to this rack.

What is claimed is:
1. A seat notably for an aircraft, comprising at least one armrest and foldaway display screen:
  a. wherein the screen comprises an articulated supporting arm mounted on a movable carriage;
  b. the armrest comprising:
    i. a circularly arcuate rail having a top end and a bottom portion, the top end of the rail being substantially vertical and the bottom portion substantially horizontal; and ii. a damping system secured to the armrest and to the carriage comprising a cable running in at least one movable pulley secured to a return spring; and c. the carriage being secured to said rail and able to move in translation between a first bottom position for stowage of the screen and a second top position of screen.

2. The seat as claimed in claim 1, wherein the articulated supporting arm comprises a hinge secured to the arm and to the movable carriage arranged so that the screen can tilt from the second top position in which the screen is in a substantially vertical position to a third top position in which the screen is in a substantially horizontal position of use.

3. The seat as claimed in claim 2, wherein the supporting arm comprises a swivel joint making it possible to rotate the screen through 90 degrees in a substantially horizontal plane from the third position of use to a fourth position of use.

4. The seat as claimed in claim 1, wherein the screen comprises a movable protective cover making it possible to use the screen as a tray.

5. The seat as claimed in claim 1, wherein the screen comprises at least one handle.

6. The seat as claimed in claim 1, wherein the seat comprises motorization means ensuring at least the movement of the carriage, said means being controlled by a user seated on the scat.

* * * * *